(12) United States Patent
Pearlman et al.

(10) Patent No.: US 7,143,687 B2
(45) Date of Patent: Dec. 5, 2006

(54) ROLLER GRILL HAVING ROLLERS WITH A ROUGHENED SURFACE

(75) Inventors: Wade Pearlman, Oakhurst, NJ (US); Richard L. Poland, Cranford, NJ (US)

(73) Assignee: Creative Serving Incorporated, Union, NJ (US)

( * ) Notice: Subject to any disclaimer, the term of this patent is extended or adjusted under 35 U.S.C. 154(b) by 238 days.

(21) Appl. No.: 10/834,585

(22) Filed: Apr. 29, 2004

(65) Prior Publication Data

US 2005/0241493 A1    Nov. 3, 2005

(51) Int. Cl.
*A47J 37/04* (2006.01)
(52) U.S. Cl. .......................... 99/441; 99/427
(58) Field of Classification Search ............... 99/441, 99/395, 427, 628, 339
See application file for complete search history.

(56) References Cited

U.S. PATENT DOCUMENTS

| 4,332,189 | A | | 6/1982 | Stuck |
| 4,370,920 | A | | 2/1983 | Henriques et al. |
| 4,516,485 | A | | 5/1985 | Miller |
| 5,351,610 | A | * | 10/1994 | Jonsson ........................ 99/628 |
| 5,396,837 | A | * | 3/1995 | Backus ......................... 99/590 |
| 5,707,326 | A | * | 1/1998 | Hyllberg ....................... 492/53 |
| 6,349,634 | B1 | * | 2/2002 | Delpierre et al. ............. 99/441 |
| 6,393,971 | B1 | | 5/2002 | Hunot et al. |
| 2002/0148359 | A1 | | 10/2002 | Hunot et al. |

* cited by examiner

*Primary Examiner*—Reginald L. Alexander
(74) *Attorney, Agent, or Firm*—Lerner, David, Littenberg, Krumholz & Mentlik, LLP

(57) ABSTRACT

A roller grill assembly includes a roller grill housing and a plurality of rollers that are rotatably mounted in the housing, each roller having an external surface. The assembly also includes one or more heating elements provided in each roller for heating the external surfaces of the rollers and a roughened coating overlying at least a portion of the external surfaces of the rollers, the roughened coating generating friction between the rollers and food items placed on the rollers for effectively rotating the food items. The roughened coating is food-safe and includes roughening particles having a size of between 5–300 microns.

23 Claims, 5 Drawing Sheets

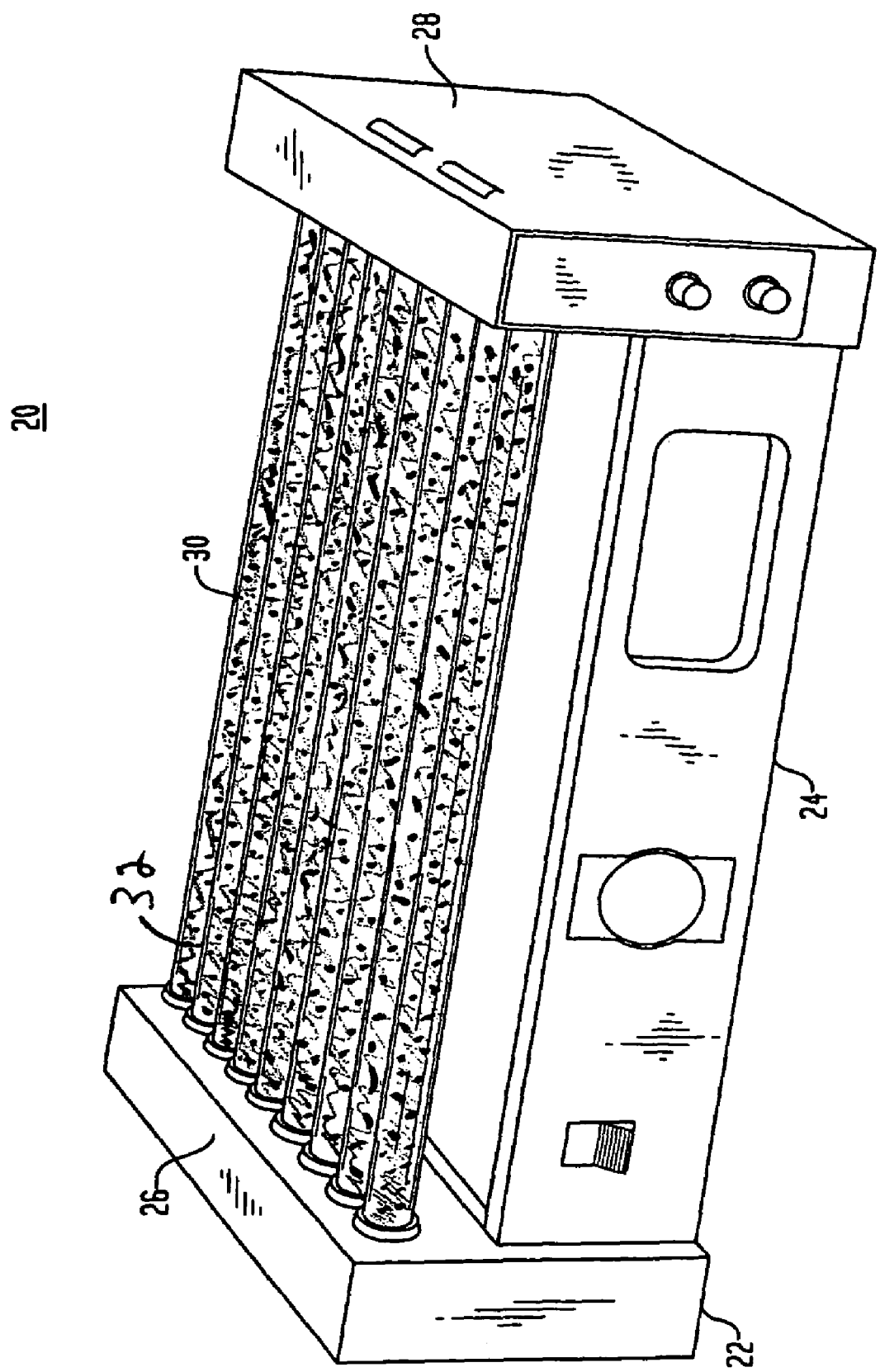

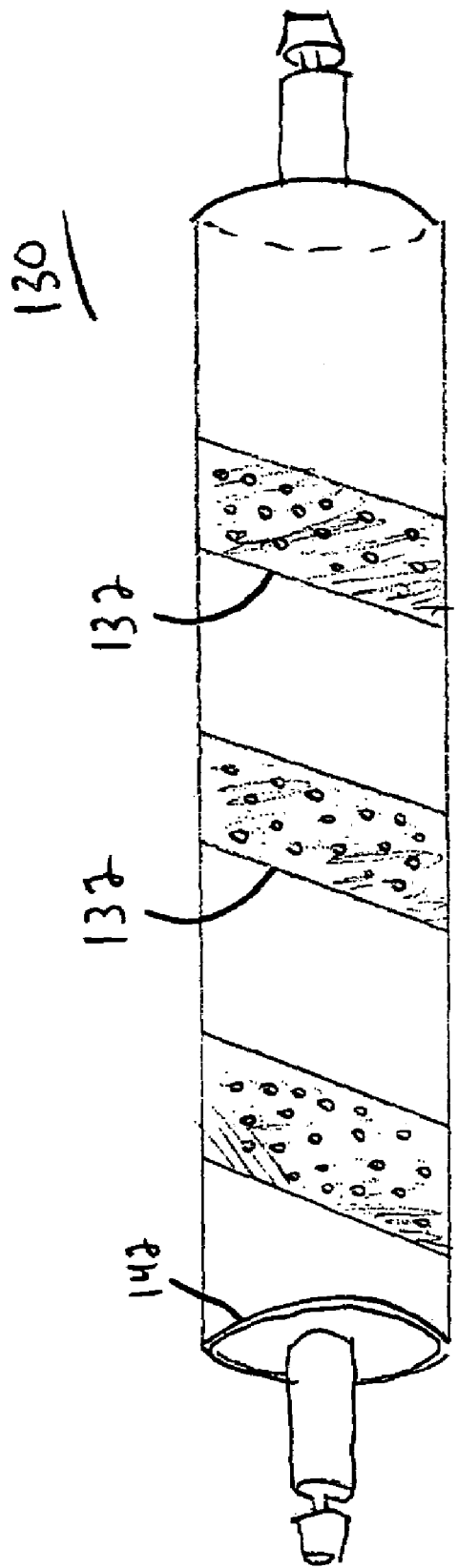
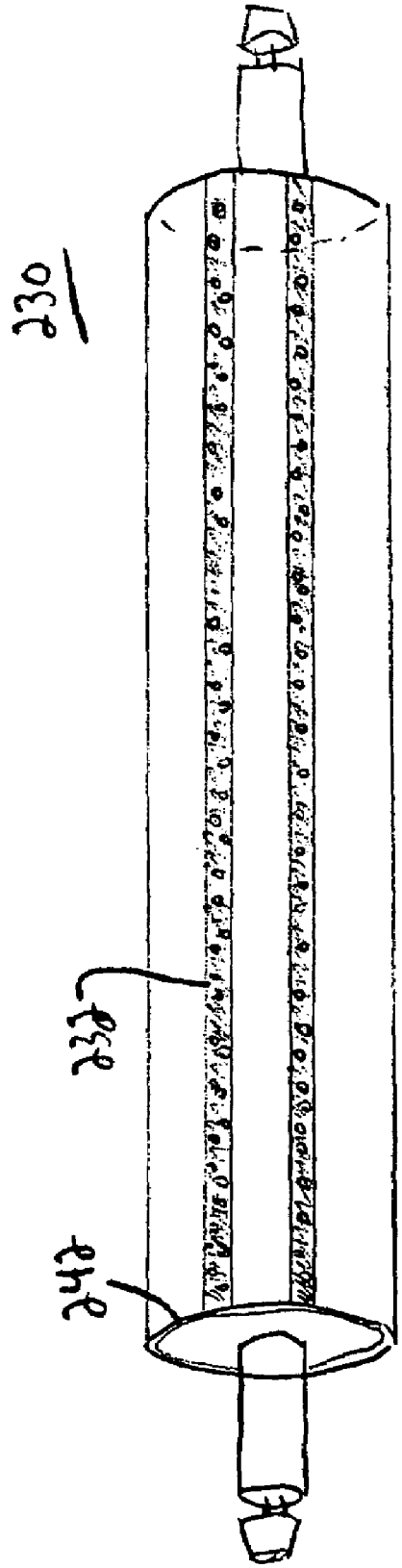
FIG. 4
FIG. 5

ROLLER GRILL HAVING ROLLERS WITH A ROUGHENED SURFACE

BACKGROUND OF THE INVENTION

The present invention generally relates to cooking equipment and more particularly relates to roller grills for cooking and heating food items.

Roller grill assemblies typically use an array of heatable tubes that are rotatably mounted within a grill housing. In operation, food items are placed upon the roller tubes and the roller tubes are rotated as heat is transferred to the food items. Unfortunately, conventional roller grills are frequently unable to effectively rotate food items having uneven or rough outer surfaces such as items having a bread-like outer layer or crust surrounding a filling, e.g. an egg roll or corn dog.

There have been some minor advances in roller grill assembly technology directed to effectively rotating food items. For example, referring to FIG. 2 of U.S. Pat. No. 6,349,634, a roller grill includes a roller 20 having a grid of wires 30 affixed to the roller. The grid is preferably disposed in contact with the surface of the roller 20 to facilitate heat transfer from the roller to food articles in contact with the roller. The grid attachment enhances the ability of the roller to both rotate and uniformly heat articles of food. The grid attachment, however, is difficult to clean, which may discourage proper cleaning of the system. This may result is unsanitary conditions.

In spite of the above advances, there remains a need for a roller grill having rollers that effectively rotate food items, particularly food items having an uneven or rough outer surface. There also remains a need for roller grills that are easy to clean.

SUMMARY OF THE INVENTION

In certain preferred embodiments of the present invention, a roller grill assembly includes a plurality of rotatable rollers disposed in an array, whereby each roller has an external surface, and a roughened coating covering at least a portion of the external surface of each roller. The roughened coating desirably generates friction between the rollers and food items placed on the rollers for effectively rotating the food items. In certain preferred embodiments, the roughened coating substantially covers the entire external surface of each roller. In other preferred embodiments, the roughened coating may only cover a portion of the external surface of each roller. The roughened coating may include a series of intermittent stripes over the external surface of the roller. In still other preferred embodiments, the roughened coating may cover about one-quarter or one-half of the roller with the remaining portion of the roller having a smooth external surface. The roughened coating may include a curable material such as a curable polymer with particles mixed therein. The particles may include binder particles having a size of about 2–15 microns and more preferably about 2–7 microns. The mixed-in particles may also include roughening particles for providing surface roughness having a size of between 5–300 microns. In certain preferred embodiments, the roughening particles over 50 microns provide the surface roughness that is discernable to human senses. In certain preferred embodiments, the binder particles effectively bind the roughening particles to the coating and to the external surface of the roller. The roughening particles are preferably food-safe particles. In highly preferred embodiments, the roughening particles may be ceramic, aluminum oxide, silicon carbide or garnet.

In certain preferred embodiments, the roller grill assembly may include a drive element coupled with the rollers for selectively rotating the rollers. The drive element may include a drive chain. Each of the rollers is preferably a cylindrical tube having a first opening at a first end, a second opening at a second end, and a hollow interior defined by an internal surface and an external surface. Each roller tube is desirably made of a thermally conductive material such as metal. In certain preferred embodiments, the metal is selected from the group consisting of stainless steel and cold rolled steel. The assembly may also include supports in contact with the first and second ends of the rollers for rotatably supporting the rollers. The assembly may also include a roller grill housing whereby the supports are secured within the housing for rotatably supporting the rollers. In highly preferred embodiments, the roughened coating includes a non-stick material such as Teflon®, with the roughening particles disposed in the non-stick material.

In other preferred embodiments of the present invention, a roller grill assembly includes a roller grill housing, a plurality of rollers being rotatably mounted in the housing, whereby each roller has an external surface, and one or more heating elements provided for heating the external surfaces of the rollers. The assembly also desirably includes a roughened coating overlying at least a portion of the external surface of the roller, wherein the roughened coating generates friction between the rollers and food items placed on the rollers for effectively rotating the food items.

In still other preferred embodiments of the present invention, a roller tube for a roller grill assembly includes a substantially cylindrical tube having first and second ends, an external surface extending between the first and second ends, and a roughened coating covering at least a portion of the external surface of the cylindrical tube. In certain preferred embodiments, the roughened coating substantially covers the external surface of the cylindrical tube. The roughened coating may include granular or roughening particles such as ceramic, aluminum oxide, silicon carbide or garnet. The roughened coating may comprise distinct areas of roughened coating material covering the external surface of the roller, with smooth areas of the external surface of the roller disposed between the roughened coating areas. The roughened coating may also comprise a contiguous area of roughened coating material completely covering the external surface of the roller.

These and other preferred embodiments of the present invention will be described in more detail below.

BRIEF DESCRIPTION OF THE DRAWINGS

FIG. 1 shows a perspective view of a roller grill having rollers with a roughened coating, in accordance with certain preferred embodiments of the present invention.

FIG. 5 shows a roller having a roughened coating over at least a portion of the external surface thereof, in accordance with still other preferred embodiments of the present invention.

FIG. 6 shows a roller having a roughened coating, in accordance with another preferred embodiment of the present invention.

DETAILED DESCRIPTION

Figure 2B:
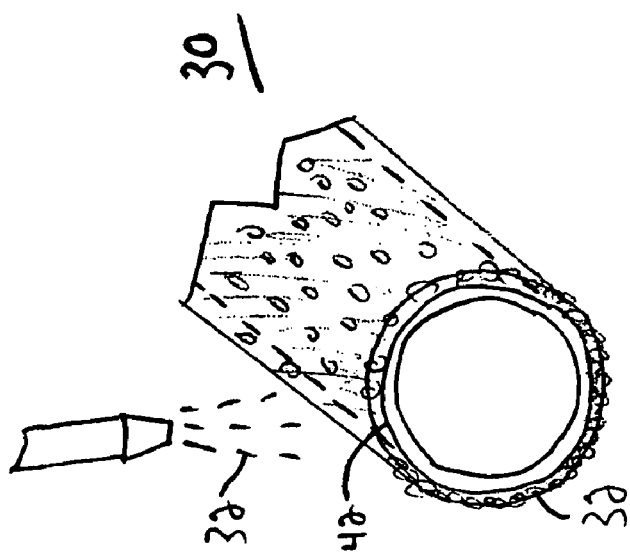
FIGS. 2A and 2B show a method of making a roller having a roughened coating, in accordance with certain preferred embodiments of the present invention.

FIG. 1 shows a roller grill assembly 20 including a housing 22 having a front control panel 24, a left support 26 and an opposing right support 28. The roller grill assembly 20 includes an array of heatable rollers 30 rotatably mounted in the left and right supports 26, 28. The heatable rollers 30 are preferably rotatable in the same direction. In operation, the heatable rollers 30 rotate and transmit heat to food items placed atop the rollers. Each heatable roller has a roughened coating 32 overlying at least a portion of an external surface of the roller. In certain preferred embodiments, the roller grill may incorporate one or more features disclosed in commonly assigned U.S. patent application Ser. No. 10/423,401, filed Apr. 25, 2003, the disclosure of which is hereby incorporated by reference herein.

Figure 2A:
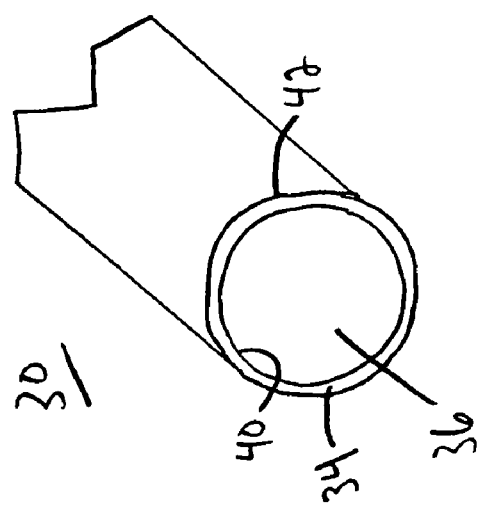

FIGS. 2A and 2B show a method of forming a roughened coating over an external surface of a roller. Referring to FIG. 2A, roller tube 30 has a first end 34 defining a first opening 36. The roller tube 30 also includes an interior surface 40 and an exterior surface 42 opposite the interior surface. The external surface of the roller is preferably cleaned before the roughened coating is applied.

Referring to FIG. 2A, a roughened coating 32 is applied over the external surface 42 of tube 30. In certain preferred embodiments, prior to application, the roughened coating is prepared by providing a food-safe, curable material such as a curable polymer and mixing roughening particles in the curable material. A binder material such as binder particles may also be mixed into the curable material for effectively binding the roughening particles to the coating and/or to the external surface of the roller. The roughened coating including the roughening particles is then applied to the external surface of the rollers. In highly preferred embodiments, the coating is sprayed onto the external surface of the rollers. The coating material is then cured to bind the coating and the roughening particles to the external surface of the roller. The roughened coating may be cured using heat or air. In certain preferred embodiments, the coating is flash cured at 200–400 F for about one-three minutes. In other preferred embodiments, the coating may be cured at 700–800 F for about three-seven minutes or at 680 F for about 12–18 minutes.

In certain preferred embodiments, the roughened coating includes a food-safe material. The roughened coating preferably includes a curable material such as a curable polymer, a curable non-stick material, or a curable liquid. The roughening particles are preferably mixed with the curable material. The roughening particles may be ceramic, aluminum oxide, silicon carbide or garnet.

In other preferred embodiments, the roughened coating may be formed by pitting the external surface of the roller and then applying a curable material over the pitted external surface, whereby the coating conforms to the shape of the external surface. The coating may have the above-described roughening particles and/or binder particles mixed therein.

Figure 3:
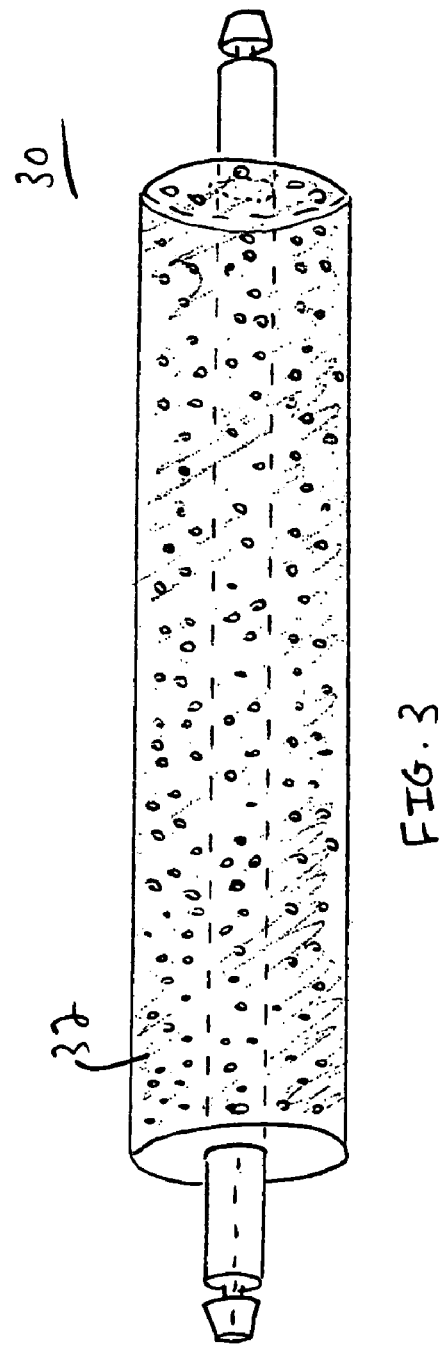
FIG. 3 shows a front elevational view of a roller for a roller grill having a roughened coating, in accordance with certain preferred embodiments of the present invention.

FIG. 3 shows roller tube 30 having a roughened coating 32 overlying an external surface of the roller tube. The roughed coating is preferably bound to the external surface of the rollers during the above-described curing process. The roughened coating has peaks and valleys that are adapted to engage the outer surfaces of food items for effectively rotating the food items, particularly those food items having a non-smooth outer surface, e.g. a corn dog or egg roll.

Figure 4:
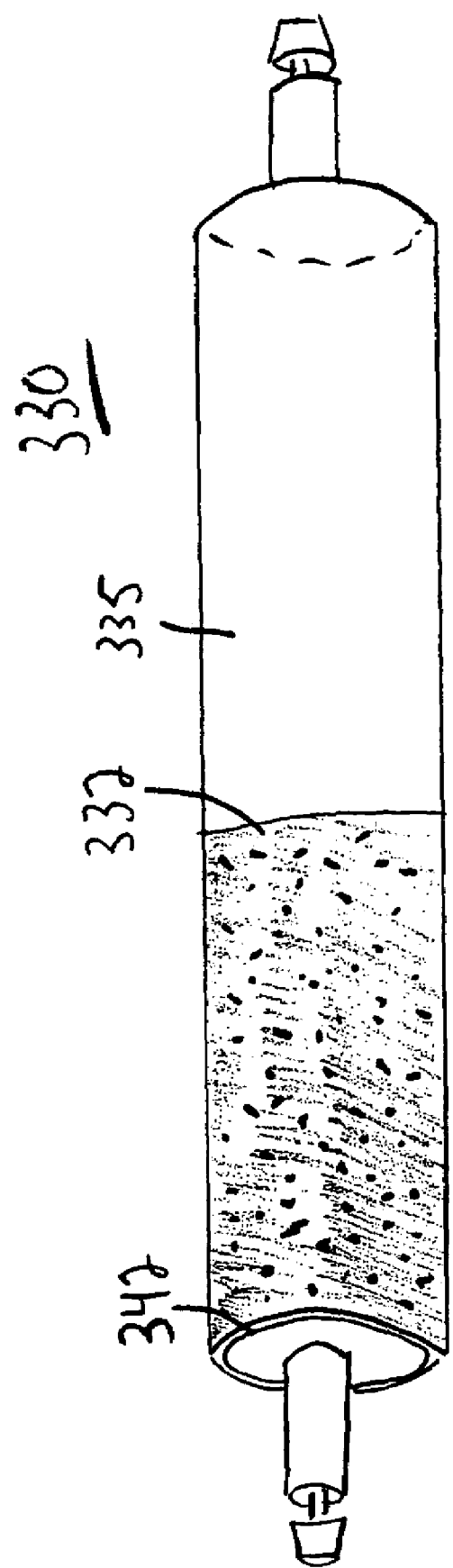
FIG. 4 shows a roller for a roller grill assembly having a roughened coating at least partially covering the external surface of the roller, in accordance with certain preferred embodiments of the present invention.

Referring to FIG. 4, in another preferred embodiment, roller tube 130 has an external surface 142 with a roughened coating 132 covering a portion of the external surface 142. The roughened coating comprises a series of stripes that extend in a direction generally perpendicular to a longitudinal axis of the roller.

Referring to FIG. 5, in another preferred embodiment of the present invention, roller 230 includes an external surface 242 having a roughened coating 232 at least partially covering a portion of the external surface 242. The roughened coating 232 comprises a series of stripes extending in a direction generally parallel to a longitudinal axis of roller 230.

Referring to FIG. 6, in another preferred embodiment of the present invention, roller 330 has an external surface 342 and a roughened coating 332 covering a portion of the external surface. In the particular preferred embodiment shown in FIG. 6, the roughened coating 333 cover approximately one-half of the external surface 342 of the roller 330, with a second half 335 of the roller being smooth or being covered by a smooth, non-stick coating over the external surface.

Figure 7:
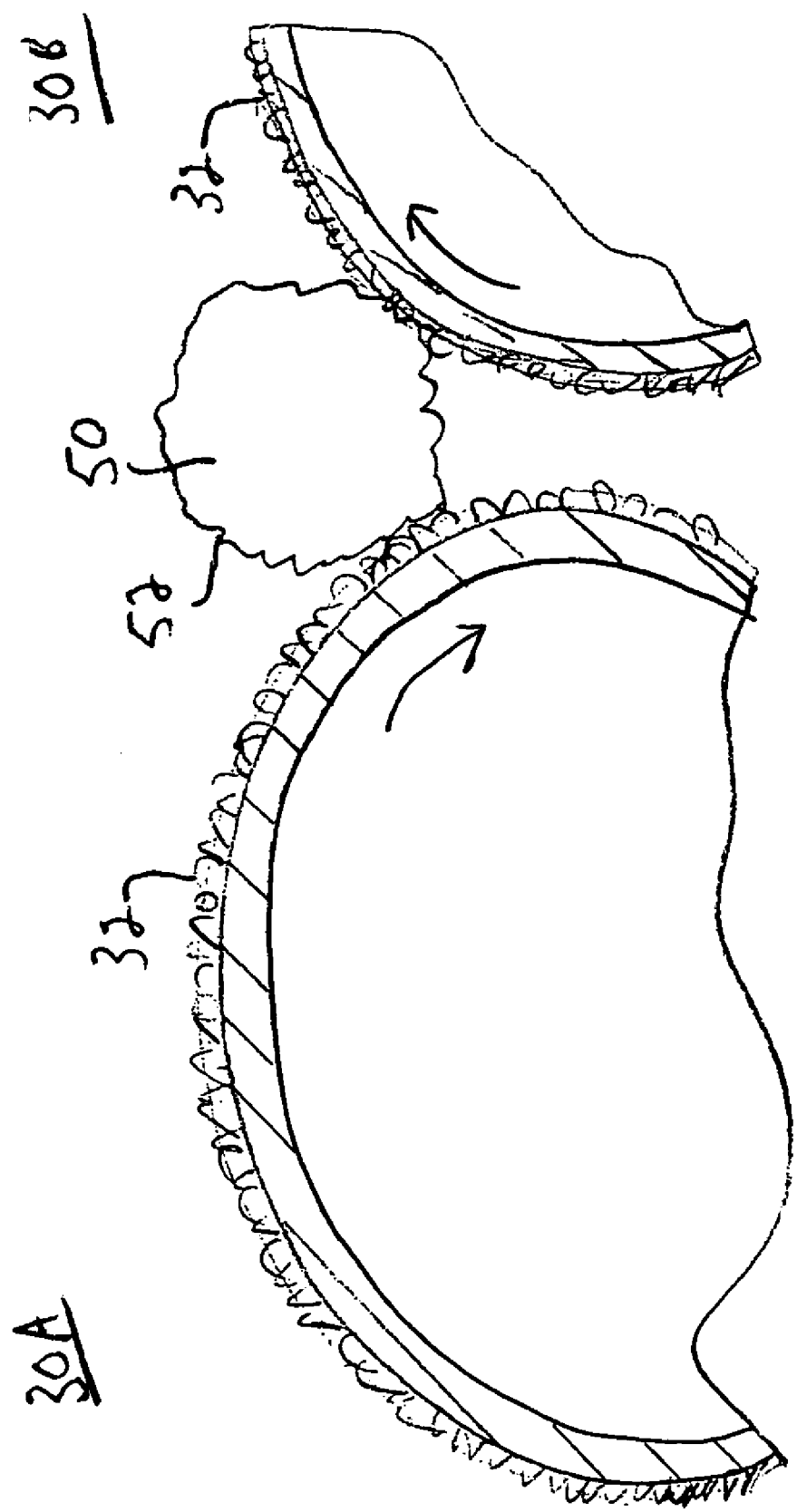
FIG. 7 shows a food item being rotated by rollers having a roughened coating, in accordance with certain preferred embodiments of the present invention.

Referring to FIG. 7, a food item 50 having a non-smooth, uneven or rough outer surface 52 is positioned between adjacent rollers 30a and 30b. When the food item 50 is placed atop rollers 30a and 30b, the peaks and valleys of the roughened coating 32 of each roller generates friction between the rollers and the outer surface of the food item 50 for effectively rotating the food item. The roughened coating provides a significant improvement over roller grills having smooth outer surfaces, particularly when attempting to rotate food items having uneven or rough outer surfaces such as egg rolls and corn dogs having a flour-based coating. Such prior art devices do not effectively rotate food items having non-smooth outer surfaces.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A roller grill assembly comprising:
   a plurality of rotatable rollers disposed in an array, each said roller having an external surface;
   a roughened coating covering at least a portion of the external surface of each said roller, wherein said roughened coating generates friction between said rollers and food items placed on said rollers for effectively rotating said food items, wherein said roughened coating includes a non-stick substance and roughening particles disposed in said non-stick substance.

2. The assembly as claimed in claim 1, wherein said roughened coating substantially covers the external surface of each said roller.

3. The assembly as claimed in claim 1, further comprising one or more heating elements thermally coupled with the external surfaces of said rollers.

4. The assembly as claimed in claim 1, wherein said roughened coating includes roughening particles mixed therein, said roughening particles having a size of between 5–400 microns.

5. The assembly as claimed in claim 4, wherein said roughening particles have a size of between 5–300 microns.

6. The assembly as claimed in claim 4, wherein said roughening particles are selected from the group consisting of ceramic, aluminum oxide, silicon carbide and garnet.

7. The assembly as claimed in claim 1, wherein each said roller is a cylindrical tube.

8. The assembly as claimed in claim 1, wherein each said roller is made of metal.

9. The assembly as claimed in claim 8, wherein said metal is selected from the group consisting of stainless steel and cold rolled steel.

10. The grill assembly as claimed in claim 1, wherein said rollers have first and second ends, and wherein said assembly further comprises supports in contact with the first and second ends of said rollers for rotatably supporting said rollers.

11. The assembly as claimed in claim 10, further comprising a roller grill housing, wherein said supports are secured to said housing for rotatably supporting said rollers.

12. A roller grill assembly comprising:
a roller grill housing;
a plurality of rollers rotatably mounted in said housing, each said roller having an external surface;
one or more heating elements provided in each said roller for heating the external surfaces of said rollers;
a roughened coating covering at least a portion of the external surfaces of said rollers, wherein said roughened coating generates friction between said rollers and food items placed on said rollers for effectively rotating said food items, and wherein said roughened coating includes a non-stick substance and roughening particles disposed in said non-stick substance.

13. The assembly as claimed in claim 12, wherein said roughened coating includes roughening particles disposed therein having a size of between 5–300 microns.

14. The assembly as claimed in claim 13, wherein said roughening particles are food safe.

15. The assembly as claimed in claim 13, wherein said roughened coating further comprises binder particles for binding said coating to the external surfaces of said rollers.

16. The assembly as claimed in claim 12, wherein said roughened coating substantially covers the external surfaces of said rollers.

17. A roller tube for a roller grill assembly comprising:
a substantially cylindrical tube having first and second ends and an external surface extending between said first and second ends, said tube being rotatably mounted in a housing of said roller grill assembly;
a roughened coating covering at least a portion of the external surface of said cylindrical tube, wherein said roughened coating includes a non-stick substance and roughening particles disposed in said non-stick substance.

18. The roller tube as claimed in claim 17, wherein said roughened coating includes roughening particles having a size of about 5–300 microns.

19. The roller tube as claimed in claim 17, wherein said roughened coating substantially covers the external surface of said cylindrical tube.

20. The roller tube as claimed in claim 18, wherein said roughening particles are selected from the group of particles consisting of ceramic, aluminum oxide, silicon carbide and garnet.

21. The roller tube as claimed in claim 17, wherein said roughened coating comprises non-contiguous areas of roughened coating material covering the external surface of said roller and regions of the external surface exposed between said roughened coating.

22. The roller tube as claimed in claim 17, wherein said roughened coating comprises a contiguous area of roughened coating material completely covering the external surface of said roller.

23. The roller tube as claimed in claim 17, wherein said roughening particles are selected from the group consisting of ceramic, aluminum oxide, silicon carbide and garnet.

\* \* \* \* \*